(12) United States Patent
Onishi et al.

(10) Patent No.: US 11,746,242 B2
(45) Date of Patent: Sep. 5, 2023

(54) WATER-REPELLENT STRUCTURE, MANUFACTURING METHOD THEREFOR, AND WATER-REPELLENT COATING AGENT EMPLOYED IN SAME

(71) Applicant: BANDO CHEMICAL INDUSTRIES, LTD., Kobe (JP)

(72) Inventors: Jun Onishi, Kobe (JP); Hiroshi Sanda, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/882,345

(22) Filed: Aug. 5, 2022

(65) Prior Publication Data

US 2022/0372303 A1 Nov. 24, 2022

Related U.S. Application Data

(63) Continuation of application No. PCT/JP2021/002881, filed on Jan. 27, 2021.

(30) Foreign Application Priority Data

Feb. 6, 2020 (JP) .................................. 2020-018523

(51) Int. Cl.
| | | |
|---|---|---|
| C09D 5/00 | (2006.01) | |
| C09D 7/40 | (2018.01) | |
| C09D 7/61 | (2018.01) | |
| C09D 191/06 | (2006.01) | |
| D06M 11/78 | (2006.01) | |
| C08K 3/04 | (2006.01) | |

(Continued)

(52) U.S. Cl.
CPC ................. *C09D 5/00* (2013.01); *C09D 7/61* (2018.01); *C09D 7/69* (2018.01); *C09D 191/06* (2013.01); *D06M 11/78* (2013.01); *C08K 3/04* (2013.01); *C08K 3/36* (2013.01); *C08K 2201/005* (2013.01); *C08K 2201/006* (2013.01); *D06M 2101/32* (2013.01); *D06M 2200/12* (2013.01)

(58) Field of Classification Search
CPC .......... C09D 7/69; C09D 7/61; C09D 191/06; D06M 11/78; D06M 2200/12; D06M 2101/32; C08K 3/36; C08K 3/04; C08K 2201/005; C08K 2201/006
USPC ......................................... 442/341; 501/133
See application file for complete search history.

(56) References Cited

U.S. PATENT DOCUMENTS

| | | | |
|---|---|---|---|
| 2009/0104347 A1 | 4/2009 | Van Benthem et al. | |
| 2010/0273636 A1* | 10/2010 | Aneziris | ................. C04B 35/66 501/133 |
| 2019/0211225 A1 | 7/2019 | Kishi et al. | |

FOREIGN PATENT DOCUMENTS

| | | | |
|---|---|---|---|
| JP | H11-302561 A | | 11/1999 |
| JP | 2004106188 | * | 4/2004 |

(Continued)

OTHER PUBLICATIONS

Partial Supplementary European Search Report issued in corresponding application No. 21751406.6, dated May 23, 2023.

*Primary Examiner* — Camie S Thompson
(74) *Attorney, Agent, or Firm* — Maschoff Brennan

(57) ABSTRACT

A water-repellent structure includes: a base material; and a water-repellent layer located on a surface of the base material. The water-repellent layer contains water-repellent particles and filler particles having an average particle size that is 20 times or more as large as an average particle size of the water-repellent particles.

12 Claims, 2 Drawing Sheets

(51) Int. Cl.
*C08K 3/36* (2006.01)
*D06M 101/32* (2006.01)

(56) References Cited

FOREIGN PATENT DOCUMENTS

| | | | |
|---|---|---|---|
| JP | 2006143688 | * | 6/2006 |
| JP | 2008-542458 | A | 11/2008 |
| JP | 2014-046984 | A | 3/2014 |
| JP | 2017-177683 | A | 10/2017 |
| JP | 2018/066365 | A1 | 4/2018 |
| JP | 2018-086786 | A | 6/2018 |
| WO | 2019/144910 | A1 | 8/2019 |

* cited by examiner

WATER-REPELLENT STRUCTURE, MANUFACTURING METHOD THEREFOR, AND WATER-REPELLENT COATING AGENT EMPLOYED IN SAME

CROSS-REFERENCE TO RELATED APPLICATIONS

This is a continuation of International Application No. PCT/JP2021/002881 filed on Jan. 27, 2021, which claims priority to Japanese Patent Application No. 2020-018523 filed on Feb. 6, 2020. The entire disclosures of these applications are incorporated by reference herein.

BACKGROUND

The present invention relates to water-repellent structures, manufacturing methods therefor, and water-repellent coating agents employed in the same.

A water-repellent treatment is performed on the surfaces of various articles as means for avoiding damage etc. caused by adhesion of water or ice. For example, International Patent Publication No. WO2018/066365A1 discloses a coating material composition containing silica particles, a reactive silicone oligomer, a silicate compound, an organic oxide, and an organic solvent as a coating material composition that is used for such a water-repellent treatment.

SUMMARY

The present invention is a water-repellent structure including: a base material; and a water-repellent layer located on a surface of the base material. The water-repellent layer contains water-repellent particles and filler particles having an average particle size that is 20 times or more as large as an average particle size of the water-repellent particles.

The present invention is a water-repellent structure including: a non-woven fabric; and a water-repellent layer located on a surface of the non-woven fabric. The water-repellent layer contains water-repellent particles and filler particles having a larger average particle size than the water-repellent particles.

The present invention is a method for manufacturing a water-repellent structure, the method including forming a water-repellent layer by coating a surface of a base material with a water-repellent coating agent. The water-repellent coating agent contains water-repellent particles, filler particles having an average particle size that is 20 times or more as large as an average particle size of the water-repellent particles, and an uncured binder resin.

The present invention is a method for manufacturing a water-repellent structure, the method including forming a water-repellent layer by coating a surface of a non-woven fabric with a water-repellent coating agent. The water-repellent coating agent contains water-repellent particles, filler particles having a larger average particle size than the water-repellent particles, and an uncured binder resin.

The present invention is a water-repellent coating agent containing water-repellent particles, filler particles having an average particle size that is 20 times or more as large as an average particle size of the water-repellent particles, and an uncured binder resin.

DETAILED DESCRIPTION

Hereinafter, an embodiment will be described in detail.

Figure 1A:
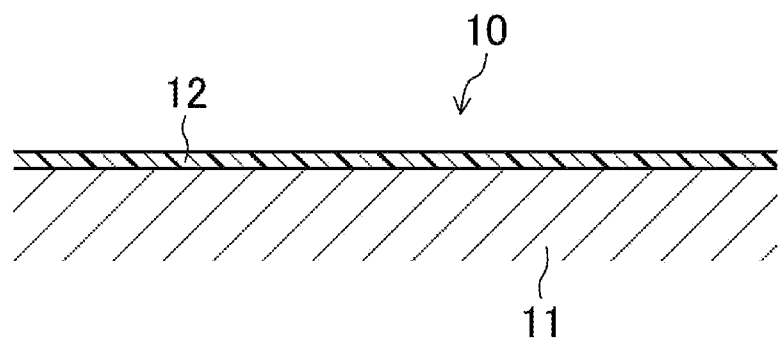
FIG. 1A is a sectional view of a water-repellent structure according to an embodiment.
Figure 1B:
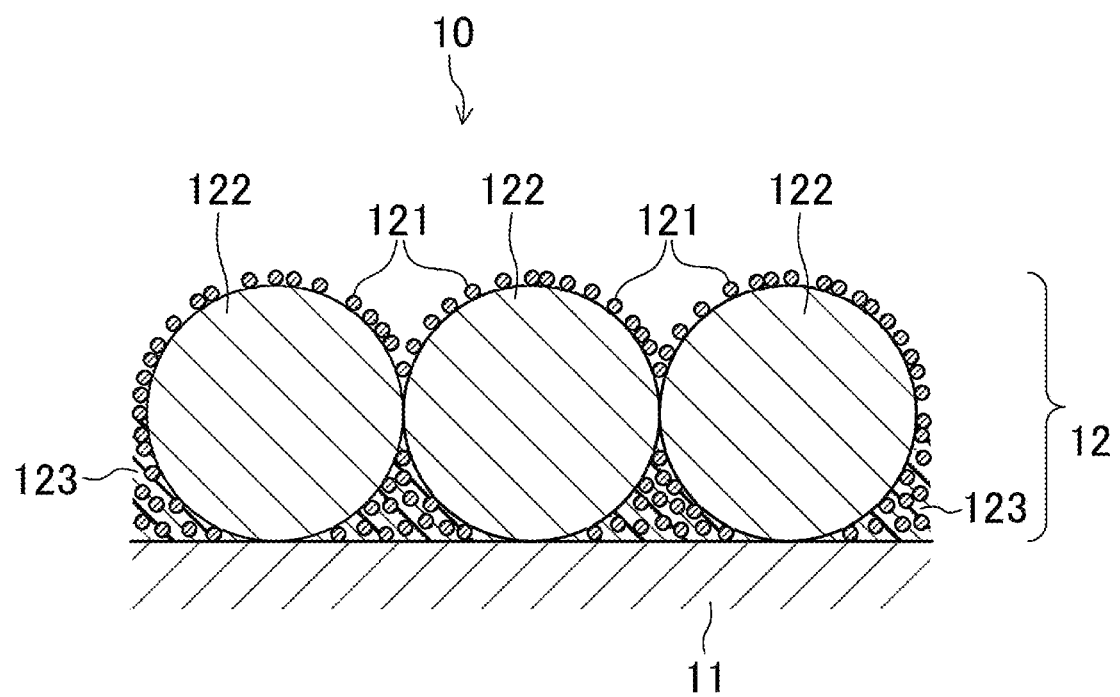
FIG. 1B is a partial enlarged sectional view of a surface layer of the water-repellent structure according to the embodiment.

FIGS. 1A and 1B show a water-repellent structure 10 according to the embodiment. The water-repellent structure 10 according to the embodiment includes a base material 11 and a water-repellent layer 12 located on a surface of the base material 11

The material of the base material 11 is not particularly limited. Examples of the material of the base material 11 include metal, wood, glass, resin, rubber, woven fabric, and non-woven fabric. From the standpoint of achieving very high water-repellent performance, the base material 11 is preferably resin or non-woven fabric.

The resin is not particularly limited. Examples of the resin include polycarbonate resins (PC), polyvinyl chloride resins (PVC), polypropylene resins (PP), polyethylene terephthalate resins (PET), polymethyl methacrylate resins (PMMA), urethane resins, epoxy resins, and melamine resins. The resin preferably includes one or more of these resins, and from the standpoint of achieving very high water-repellent performance, more preferably includes a polycarbonate resin and/or a polyvinyl chloride resin.

The non-woven fabric is not particularly limited, and non-woven fabrics manufactured by various known manufacturing methods can be used. An example of the non-woven fabric is a spunbond non-woven fabric manufactured by a spunbond method.

Fibers forming the non-woven fabric are not particularly limited, but are preferably synthetic fibers. Examples of the fibers forming the non-woven fabric include polyester fibers, polypropylene fibers, polyethylene fibers, polyamide fibers, rayon fibers, acrylic fibers, cellulose fibers, nylon fibers, polyolefin fibers, vinylon fibers, and glass fibers. The fibers forming the non-woven fabric preferably include one or more of these fibers, and from the standpoint of achieving very high water-repellent performance and high abrasion resistance, more preferably include polyester fibers. Commercially available non-woven fabrics formed by fibers including polyester fibers are, for example, the Eltas series made by Asahi Kasei Corporation.

The fiber diameter of the fibers forming the non-woven fabric is not particularly limited. However, from the standpoint of achieving high abrasion resistance, the fiber diameter of the fibers forming the non-woven fabric is, for example, 5 μm or more and 25 μm or less.

From the standpoint of ensuring the strength of the water-repellent structure 10 and achieving very high water-repellent performance, the basis weight of the non-woven fabric is preferably 20 g/m$^2$ or more, more preferably 50 g/m$^2$ or more, even more preferably 100 g/m$^2$ or more, and preferably 800 g/m$^2$ or less.

The form of the base material 11 is not particularly limited. For example, the base material 11 may be in the form of a sheet, a plate, a tube, or a lump. The surface of the base material 11 on which the water-repellent layer 12 is located may be either a smooth surface or an uneven surface.

The water-repellent layer 12 contains water-repellent particles 121 and filler particles 122 having a larger average particle size than the water-repellent particles 121. According to the water-repellent structure 10 of the embodiment, since the water-repellent layer 12 contains the water-repellent particles 121 and the filler particles 122 having a larger average particle size than the water-repellent particles 121, very high water-repellent performance can be achieved. This is considered to be for the following reason. As shown in FIG. 1B, the water-repellent particles 121 enter between the filler particles 122, and the surface area where the water-repellent particles 121 can be present is increased by the surface unevenness formed by the filler particles 122. Many water-repellent particles 121 are thus distributed along the surfaces of the filler particles 122, which increases the water-repellent performance obtained by the water-repellent particles 121.

Figure 1C:
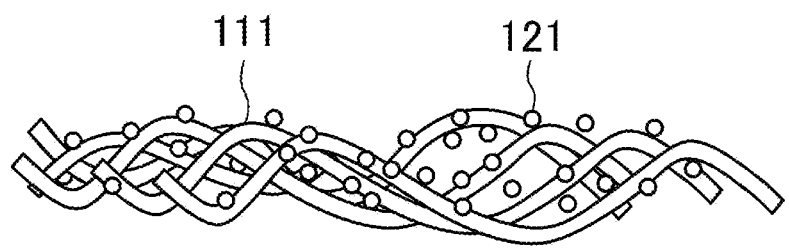
FIG. 1C is a partial enlarged sectional view of a non-woven fabric of the water-repellent structure according to the embodiment.

According to the water-repellent structure 10 in which the base material 11 is a non-woven fabric, the water-repellent layer 12 is located on the surface of the non-woven fabric. Therefore, high abrasion resistance can be achieved. This is considered to be for the following reason. As shown in FIG. 1C, the water-repellent particles 121 enter between fibers 111 forming the non-woven fabric, and the water-repellent particles 121 cover the fibers 111, so that durability of the non-woven fiber is increased.

Examples of the water-repellent particles 121 include nanosilica and ungranulated carbon black. The water-repellent particles 121 preferably include either or both of nanosilica and ungranulated carbon black, and from the standpoint of achieving non-black, very high water-repellent performance, more preferably include nanosilica.

As used herein, the term "nanosilica" means silica particles having an average particle size (primary particle size) of less than 1 µm. Examples of nanosilica include fumed silica, precipitated silica, gel silica, and colloidal silica. Nanosilica preferably includes one or more of these, and from the standpoint of achieving very high water-repellent performance, more preferably includes fumed silica. Commercially available fumed silica is, for example, the AEROSIL series made by NIPPON AEROSIL CO., LTD.

Fumed silica is divided into hydrophilic fumed silica without surface treatment and hydrophobic fumed silica in which silanol group portions have been chemically surface-treated with silane and/or siloxane. Nanosilica preferably includes either or both of hydrophilic fumed silica and hydrophobic fumed silica, and from the standpoint of achieving very high water-repellent performance, more preferably includes hydrophilic fumed silica.

As used herein, the term "ungranulated carbon black" means carbon black in which primary particles are not agglomerated into granulates. Therefore, "ungranulated carbon black" as used herein includes fine carbon black powder containing no granulating agent, fine carbon black powder not surface-treated for granulation, and fine carbon black powder intentionally excluded from having functional groups containing oxygen and/or hydrogen that contribute to granulation, namely fine carbon black powder having substantially no such functional groups.

On the other hand, "ungranulated carbon black" as used herein does not include granular carbon black containing a granulating agent, granular carbon black surface-treated for granulation, and granular carbon black into which functional groups containing oxygen and/or hydrogen that contribute to granulation have been intentionally introduced. However, these granular carbon blacks, when they have lost their granular form and turned into fine powder by a baking process etc., are included in "ungranulated carbon black" as used herein. The ungranulated carbon black of the present application also includes ungranulated carbon nanotubes and ungranulated carbon graphite.

It is preferable that no intensity peaks of $H_2O$(—OH), CO(CHO, >CO), and $CO_2$(—COOH) be detected in the ungranulated carbon black in the analysis temperature range of 50° C. or more and 800° C. or less by gas chromatography-mass spectrometry (GC-MS analysis). In the ungranulated carbon black, the oxygen content from functional groups is preferably 0.03 mass % or less, more preferably 0.02 mass % or less, even more preferably 0.01 mass % or less.

Examples of the ungranulated carbon black include: acetylene black; channel blacks; furnace blacks such as SAF, ISAF, N339, HAF, MAF, FEF, SRF, GPF, ECF, and N234; and thermal blacks such as FT and MT. The ungranulated carbon black preferably includes one or more of these. From the standpoint of achieving very high water-repellent performance, the ungranulated carbon black preferably includes acetylene black. Examples of commercially available ungranulated acetylene black include powder products under the trade name "DENKA BLACK" made by Denka Company Limited.

From the standpoint of achieving very high water-repellent performance, the average particle size (primary particle size) of the water-repellent particles 121 is preferably 5 nm or more and 100 nm or less, more preferably 10 nm or more and 70 nm or less, even more preferably 15 nm or more and 50 nm or less. The average particle size of the water-repellent particles 121 is calculated based on measurement by electron microscope observation.

From the standpoint of achieving very high water-repellent performance, the BET specific surface area of the water-repellent particles 121 is preferably 10 $mm^2/g$ or more and 300 $mm^2/g$ or less, more preferably 20 $mm^2/g$ or more and 200 $mm^2/g$ or less, even more preferably 35 $mm^2/g$ or more and 130 $mm^2/g$ or less. The BET specific surface area of the water-repellent particles 121 is measured based on JIS Z 8830:2013.

Examples of the filler particles 122 include: inorganic particles such as silica particles having an average particle size of 1 µm or more (hereinafter referred to as "large particle size silica"), calcium particles, montmorillonite particles, mica particles, and talc particles; and organic particles such as acrylic resin particles and polyethylene resin particles. The filler particles 122 preferably include or more of these. From the standpoint of achieving very high water-repellent performance, the filler particles 122 more preferably include large particle size silica.

Large particle size silica is divided into hydrophilic large particle size silica without surface treatment and hydrophobic large particle size silica in which silanol group portions have been chemically surface-treated with silane and/or siloxane. The large particle size silica preferably includes either or both of hydrophilic large particle size silica and hydrophobic large particle size silica, and from the standpoint of achieving very high water-repellent performance, more preferably includes hydrophilic large particle size silica.

From the standpoint of achieving very high water-repellent performance, the average particle size of the filler particles 122 is preferably 1 µm or more and 50 µm or less, more preferably 2 µm or more and 50 µm or less, even more preferably 3 µm or more and 5 µm or less. The average particle size of the filler particles 122 is measured by a laser diffraction scattering method.

The filler particles 122 have a larger average particle size than the water-repellent particles 121. From the standpoint of achieving very high water-repellent performance, the average particle size of the filler particles 122 is preferably 20 times or more and 250 times or less, more preferably 30 times or more and 200 times or less, even more preferably 40 times or more and 100 times or less, even more preferably 50 times or more and 70 times or less, as large as the average particle size of the water-repellent particles 121.

The filler particles 122 are preferably porous. From the standpoint of achieving very high water-repellent performance, the BET specific surface area of the filler particles 122 is preferably 150 mm$^2$/g or more and 700 mm$^2$/g or less, more preferably 200 mm$^2$/g or more and 400 mm$^2$/g or less, even more preferably 250 mm$^2$/g or more and 350 mm$^2$/g or less. Like the water-repellent particles 121, the BET specific surface area of the filler particles 122 is also measured based on JIS Z 8830:2013.

From the standpoint of achieving very high water-repellent performance, the ratio of the BET specific surface area of the filler particles 122 to the BET specific surface area of the water-repellent particles 121 is preferably 2 or more and 20 or less, more preferably 3 or more and 15 or less, even more preferably 4 or more and 10 or less. From the standpoint of achieving very high water-repellent performance, the BET specific surface area of the filler particles 122 is preferably larger than the BET specific surface area of the water-repellent particles 121.

From the standpoint of achieving very high water-repellent performance, the mass content of the filler particles 122 is preferably higher than the mass content of the water-repellent particles 121 in the water-repellent structure 10 according to the embodiment. The mass ratio of the content of the filler particles 122 to the content of the water-repellent particles 121 in the water-repellent structure 10 according to the embodiment is preferably 1 or more and 18 or less, more preferably 2 or more and 15 or less, even more preferably 3 or more and 12 or less.

The water-repellent layer 12 may be composed only of the water-repellent particles 121 and the filler particles 122. However, from the standpoint of increasing fixability of the water-repellent particles 121 and the filler particles 122 to the base material 11, the water-repellent layer 12 preferably further contains a binder resin 123.

Examples of the binder resin 123 include thermosetting resins, thermoplastic resins, and photocurable resins. Examples of the thermosetting resins include silicone resins, epoxy resins, phenol resins, urea resins, and melamine resins. Examples of the thermoplastic resins include polyethylene resins, polypropylene resins, polyamide resins, polyester resins, and polyurethane resins. Examples of the photocurable resins include epoxy compounds and urethane compounds with added acrylic acid. The binder resin 123 preferably includes one or more of these.

From the standpoint of increasing fixability of the water-repellent particles 121 and the filler particles 122 to the base material 11 and achieving high water-repellent performance, the binder resin 123 preferably includes a silicone resin. Examples of silicone resins include polyalkoxysiloxane, polyalkylsiloxane, polyalkylalkoxysiloxane, polyarylsiloxane, polyarylalkylsiloxane, and polyethersiloxane. Of these silicone resins, the binder resin 123 preferably includes polyalkoxysiloxane. An example of a commercially available uncured silicone resin material for the binder resin 123 is the trade name "XR31-B2733" made by Momentive Performance Materials Japan LLC.

From the standpoint of achieving very high water-repellent performance, the content of the binder resin 123 in the water-repellent layer 12 is preferably 5 mass % or more and 30 mass % or less, more preferably 10 mass % or more and 25 mass % or less, even more preferably 15 mass % or more and 20 mass % or less.

From the standpoint of increasing fixability of the water-repellent particles 121 and the filler particles 122 to the base material 11 and achieving very high water-repellent performance, the total content of the water-repellent particles 121 and the filler particles 122 per 100 parts by mass of the binder resin 123 is preferably 10 parts by mass or more and 40 parts by mass or less, more preferably 15 parts by mass or more and 35 parts by mass or less, even more preferably 20 parts by mass or more and 30 parts by mass or less. From a similar standpoint, the content of the water-repellent particles 121 per 100 parts by mass of the binder resin 123 is preferably 1 part by mass or more and 20 parts by mass or less, more preferably 2 parts by mass or more and 10 parts by mass or less, even more preferably 3 parts by mass or more and 6 parts by mass or less. From a similar standpoint, the content of the filler particles 122 per 100 parts by mass of the binder resin 123 is preferably 5 parts by mass or more and 35 parts by mass or less, more preferably from 10 parts by mass or more and 30 parts by mass or less, even more preferably 15 parts by mass or more and 25 parts by mass or less.

From the standpoint of achieving very high water-repellent performance and high abrasion resistance, the water-repellent layer 12 preferably further contains an oxidized polyolefin wax.

The oxidized polyolefin wax is a wax produced by oxidizing a polyolefin wax and introducing polar groups such as carboxyl groups and hydroxyl groups. This oxidized polyolefin wax is generally known by the name of oxidized type polyolefin wax etc. and is commercially available.

The polyolefin wax is typically a low molecular weight polyolefin having a molecular weight of 10,000 or less. Examples of the polyolefin wax include polyethylene waxes, polypropylene waxes, high-density and low-density polymerized polyethylene waxes, and high-density and low-density polymerized polypropylene waxes.

Examples of the oxidized polyolefin wax include ethylene-acrylic acid copolymer waxes, ethylene-vinyl acetate copolymer waxes, ethylene oxide-vinyl acetate copolymer waxes, ethylene-maleic anhydride copolymer waxes, propylene-maleic anhydride copolymer waxes, and high-density oxidized polyethylene waxes. The oxidized polyolefin wax preferably includes one or more of these.

From the standpoint of achieving very high water-repellent performance and high abrasion resistance, the oxidized polyolefin wax preferably includes an ethylene-acrylic acid copolymer wax and/or a high-density oxidized polyethylene wax. An example of a commercially available ethylene-acrylic acid copolymer wax is the trade name "AC540" made by Honeywell International Inc. An example of a commercially available high-density oxidized polyethylene wax is the trade name "AC320" made by Honeywell International Inc.

From the standpoint of achieving very high water-repellent performance and high abrasion resistance, the content of the oxidized polyolefin wax per 100 parts by mass of the binder resin 123 is preferably 1 part by mass or more and 30 parts by mass or less, more preferably 7 parts by mass or more and 21 parts by mass or less.

From the standpoint of achieving very high water-repellent performance and high abrasion resistance, the content of the oxidized polyolefin wax relative to the sum of the contents of the water-repellent particles 121, the filler particles 122, and the binder resin 123 is preferably 1 mass % or more and 25 mass % or less, more preferably 5 mass % or more and 15 mass % or less.

When the water-repellent layer 12 contains the oxidized polyolefin wax, the mass content of the water-repellent particles 121 in the water-repellent structure 10 according to the embodiment is preferably higher than the mass content of the filler particles 122 from the standpoint of achieving very high water-repellent performance and high abrasion resistance. The mass ratio of the content of the water-repellent particles 121 to the content of the filler particles 122 in the water-repellent structure 10 according to the embodiment is preferably 1 or more and 36 or less, more preferably 5 or more and 20 or less, even more preferably 7 or more and 15 or less.

When the water-repellent layer 12 contains the oxidized polyolefin wax, the total content of the water-repellent particles 121 and the filler particles 122 per 100 parts by mass of the binder resin 123 is preferably 10 parts by mass or more and 40 parts by mass or less, more preferably 15 parts by mass or more and 35 parts by mass or less, even more preferably 20 parts by mass or more and 30 parts by mass or less from the standpoint of increasing fixability of the water-repellent particles 121 and the filler particles 122 to the base material 11 and achieving very high water-repellent performance. From a similar standpoint, the content of the water-repellent particles 121 per 100 parts by mass of the binder resin 123 is preferably 15 parts by mass or more and 50 parts by mass or less, more preferably 20 parts by mass or more and 45 parts by mass or less, even more preferably 30 parts by mass or more and 40 parts by mass or less. From a similar standpoint, the content of the filler particles 122 per 100 parts by mass of the binder resin 123 is preferably 1 part by mass or more and to 8 parts by mass or less, more preferably 2 parts by mass or more and to 7 parts by mass or less, even more preferably 3 parts by mass or more and 6 parts by mass or less.

From the standpoint of achieving very high water-repellent performance, the water-repellent layer 12 preferably further contains a fluororesin contained in the binder resin 123 in such a manner that the fluororesin is uniformly dissolved in the binder resin 123. From the standpoint of achieving very high water-repellent performance, the content of the fluororesin per 100 parts by mass of the binder resin 123 is preferably 0.2 parts by mass or more and 1.8 parts by mass or less, more preferably 0.5 parts by mass or more and 1.5 parts by mass or less, even more preferably 0.8 parts by mass or more and 1.2 parts by mass or less.

The thickness of the water-repellent layer 12 is preferably 0.02 mm or more, more preferably 0.05 mm or more from the standpoint of achieving very high water-repellent performance, and is preferably 0.2 mm or less, more preferably 0.1 mm or less from the standpoint of retaining the strength of the water-repellent layer 12.

The contact angle with water, which is a measure of static water repellency of the water-repellent structure 10 according to the embodiment, is preferably 130° or more, more preferably 140° or more, even more preferably 150° or more. The contact angle is measured by a tangent method by dripping pure water onto the surface of the water-repellent structure 10 according to the embodiment under the following conditions: a temperature of 25±5° C. and a humidity of 50±10%.

The sliding angle of water, which is a measure of mobility of water droplets on the water-repellent structure 10 according to the embodiment, is preferably 40° or less, more preferably 30° or less, even more preferably 20° or less. The sliding angle is measured by a sliding method by dripping pure water onto the surface of the water-repellent structure 10 according to the embodiment under the following conditions: a temperature of 25±5° C. and a humidity of 50±10%.

Figure 2:
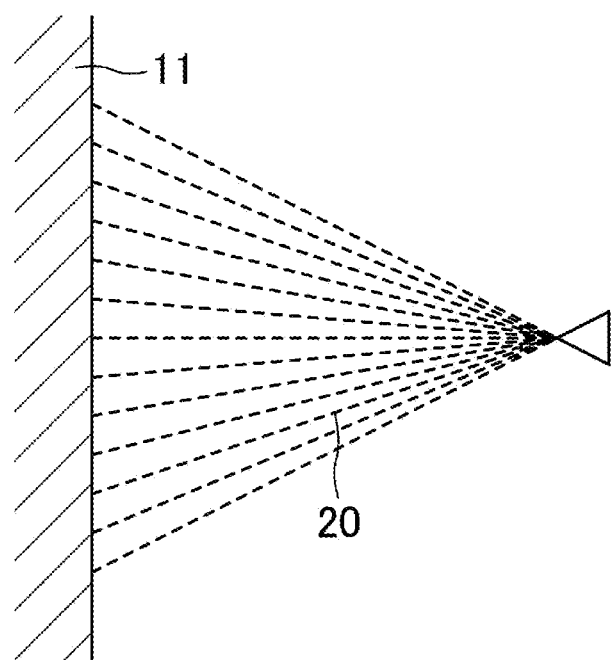
FIG. 2 is an illustration showing a method for manufacturing a water-repellent structure according to the embodiment.

As shown in FIG. 2, such a water-repellent structure 10 according to the embodiment can be obtained by, for example, forming the water-repellent layer 12 on the surface of the base material 11 by coating the surface of the base material 11 with a water-repellent coating agent 20 containing the water-repellent particles 121, the filler particles 122, and the uncured binder resin 123.

From the standpoint of forming a uniform water-repellent layer 12 that exhibits very high water-repellent performance, the water-repellent coating agent 20 preferably further contains an organic solvent that disperses the water-repellent particles 121 and the filler particles 122 and dissolves the uncured binder resin 123.

Examples of the organic solvent include aromatic hydrocarbon solvents, aliphatic hydrocarbon solvents, alcohol solvents, ketone solvents, and ester solvents. Examples of the aromatic hydrocarbon solvents include benzene, toluene, and xylene. Examples of the aliphatic hydrocarbon solvents include n-hexane, isohexane, cyclohexane, n-octane, isooctane, decane, and dodecane. Examples of the alcohol solvents include methanol, ethanol, and isopropanol. Examples of the ketone solvents include methyl ethyl ketone and methyl isobutyl ketone. Examples of the ester solvents include ethyl acetate and isobutyl acetate. The organic solvent preferably includes one or more of these, and from the standpoint of forming a uniform water-repellent layer 12 that exhibits very high water-repellent performance, preferably includes an aromatic hydrocarbon solvent, more preferably includes toluene and/or xylene.

The water-repellent coating agent 20 may contain a catalyst for curing reaction of the binder resin 123. When the binder resin 123 is a silicone resin, the catalyst is, for example, an organic titanium compound, an organic aluminum compound, an organic zirconium compound, an organic zinc compound, an organic tin compound, an organic cobalt compound, or a phosphate compound. The catalyst preferably includes one or more of these, more preferably includes an organic titanium compound. The content of the catalyst is, for example, 3 parts by mass or more and 9 parts by mass or less per 100 parts by mass of the binder resin 123.

From the standpoint of forming a uniform water-repellent layer 12 that exhibits very high water-repellent performance, the concentration of the total solids other than the organic solvent in the water-repellent coating agent 20 is preferably 10 mass % or more and 35 mass % or less, more preferably 15 mass % or more and 30 mass % or less, even more preferably 20 mass % or more and 25 mass % or less. The concentration of the total solids may be set to a value outside the above numerical ranges so that the water-repellent coating agent 20 has a desired viscosity.

Examples of means for coating the surface of the base material 11 with the water-repellent coating agent 20 include Meyer bar coating, applicator coating, spray coating, roller coating, gravure coater coating, die coater coating, lip coater coating, comma coater coating, knife coater coating, reverse coater coating, spin coater coating, dip coating, and brush coating. Among these coating means, spray coating is preferable in view of its satisfactory workability. In the case where a non-woven fabric is used as the base material 11, dip coating is preferable from the standpoint of achieving very high water-repellent performance and high abrasion resistance.

Moreover, the water-repellent structure 10 according to the embodiment can also be obtained by, for example, forming the water-repellent layer 12 by coating the surface of the base material 11 with an adhesive in advance by spray coating etc. and coating the resultant surface of the base material 11 with the water repellent particles 121 and the filler particles 122 by spray coating etc.

The water-repellent structure 10 according to the embodiment having the above configuration can be applied to, for example, formworks for concrete molding. The water-repellent structure 10 according to the embodiment can also be applied to, for example, ship bottom coating for reducing water resistance. The water-repellent structure 10 according to the embodiment can also be applied to a water-repellent treatment for tire grooves of bicycles, two-wheeled vehicles, automobiles, etc. for reducing hydroplaning. The water-repellent structure 10 according to the embodiment can also be applied to a water-repellent treatment for drainage ditches for flooding control measures. In addition, the water-repellent structure 10 according to the embodiment can also be applied to reduce freezing of roads or bridges that affects passage of people and vehicles, to reduce snow accumulation on roofs of ordinary houses, power lines, etc. in areas with heavy snowfall, and to reduce water resistance in sewage pipes etc., and can also be applied to a surface treatment of blades for surfing, skiing, snowmobiles, ship propellers, etc., a water-repellent treatment of surfaces of conveyor belts, a water-repellent treatment of surfaces of films or sheets, etc.

The water-repellent structure 10 in which the base material 11 is a non-woven fabric is applicable to, for example, control panels for civil engineering machines. The water-repellent structure 10 in which the base material 11 is a non-woven fabric is also applicable to, for example, water-repellent sheets that are installed in vehicles.

In the above embodiment, the water-repellent layer 12 is provided directly on the base material 11. However, the present invention is not particularly limited to this, and an underlying layer may be interposed between the base material 11 and the water-repellent layer 12, as necessary.

EXAMPLES

Evaluation Test 1

(Water-Repellent Structures)
The following water-repellent structures of Examples 1-1 to 1-6 were produced. The configurations of these water-repellent structures are also shown in Table 1.

Example 1-1

A water-repellent coating agent was prepared by adding an uncured silicone resin (XR31-B2733 made by Momentive Performance Materials Japan LLC.) that would serve as a binder resin, an organic titanium compound (TC-750 made by Matsumoto Fine Chemical Co., Ltd., titanium diisopropoxy bis(ethyl acetoacetate)) as a curing agent, hydrophilic fumed silica (AEROSIL OX50 made by NIPPON AEROSIL CO., LTD, average particle size: 40 nm, BET specific surface area: 50±15 $m^2/g$) as water-repellent particles, and hydrophilic large particle size silica (SYLYSIA 310P made by FUJI SILYSIA CHEMICAL LTD., average particle size: 2.7 μm, BET specific surface area: 300 $m^2/g$) as filler particles to xylene as an organic solvent and stirring the resultant mixture. The water-repellent coating agent was prepared so that the uncured silicone resin solid concentration was 17 mass %, the contents of the organic titanium compound, hydrophilic fumed silica, and hydrophilic large particle size silica were 6 parts by mass, 5 parts by mass, and 16 parts by mass per 100 parts by mass of the uncured silicone resin, respectively, and the total solids concentration was 20 mass %. A surface of a base material that was a polycarbonate resin plate was spray-coated with this water-repellent coating agent and then left indoors for drying. A water-repellent structure in which a water-repellent layer was formed on the base material was thus obtained. This water-repellent structure was used as Example 1-1.

Example 1-2

A water-repellent coating agent was prepared by adding an uncured silicone resin that would serve as a binder resin, an organic titanium compound as a curing agent, hydrophilic fumed silica (AEROSIL R972 made by NIPPON AEROSIL CO., LTD, average particle size: 16 nm, BET specific surface area: 110±20 $m^2/g$) as water-repellent particles, and hydrophilic large particle size silica as filler particles to toluene as an organic solvent and stirring the resultant mixture. The water-repellent coating agent was prepared so that the uncured silicone resin solid concentration was 17 mass %, the contents of the organic titanium compound, hydrophilic fumed silica, and hydrophilic large particle size silica were 6 parts by mass, 2 parts by mass, and 24 parts by mass per 100 parts by mass of the uncured silicone resin, respectively, and the total solids concentration was 21 mass %. A water-repellent structure obtained in a manner similar to that of Example 1-1 except that this water-repellent coating agent was used was used as Example 1-2.

Example 1-3

A water-repellent structure, which was obtained in a manner similar to that of Example 1-2 except that a water-repellent coating agent prepared by adding 6 parts by mass of a fluororesin solution (FluoroSurf FS2060-15 made by Fluoro Technology Co., LTD., 15 mass % solution) (0.9 parts by mass of a fluororesin solid content) per 100 parts by mass of a silicone resin was used, was used as Example 1-3.

Example 1-4

A water-repellent structure, which was obtained in a manner similar to that of Example 1-2 except that a water-repellent coating agent prepared by adding hydrophobic large particle size silica (SYLOPHOBIC 100 made by FUJI SILYSIA CHEMICAL LTD., average particle size: 2.7 μm, BET specific surface area: 300 $m^2/g$) instead of the hydrophilic large particle size silica as filler particles was used, was used as Example 1-4.

Example 1-5

A water-repellent structure, which was obtained in a manner similar to that of Example 1-4 except that a water-repellent coating agent prepared by adding 6 parts by mass of a fluororesin solution (0.9 parts by mass of a fluororesin solid content) per 100 parts by mass of a silicone resin was used, was used as Example 1-5.

Example 1-6

A water-repellent coating agent was prepared by adding an uncured silicone resin that would serve as a binder resin, an organic titanium compound as a curing agent, ungranulated carbon black (DENKA BLACK Li-100 made by Denka Company Limited, average particle size: 35 nm, BET specific surface area: 68 m$^2$/g) as water-repellent particles, and hydrophilic large particle size silica as filler particles to xylene as an organic solvent and stirring the resultant mixture. The water-repellent coating agent was prepared so that the uncured silicone resin solid concentration was 17 mass %, the contents of the organic titanium compound, ungranulated carbon black, and hydrophilic large particle size silica were 6 parts by mass, 4 parts by mass, and 24 parts by mass per 100 parts by mass of the uncured silicone resin, respectively, and the total solids concentration was 22 mass %. A water-repellent structure obtained in a manner similar to that of Example 1-1 except that this water-repellent coating agent was used was used as Example 1-6.

repellent structure was perpendicular to the water surface. The degree to which the surface of the water-repellent structure taken out of the mortar had been stained with the mortar was visually evaluated in three levels, A: no mortar stain, B: slight mortar stain, and C: heavy mortar stain.

(Test Results)

The test results are shown in Table 1. According to Table 1, it can be seen that each of Examples 1-1 to 1-6 has so-called super water repellency with a contact angle of 140° or more, has a small sliding angle, and is highly resistant to mortar stain.

Comparison of the contact angle among Examples 1-1 to 1-5 shows that Example 1-1 containing a combination of hydrophilic fumed silica and hydrophilic large particle size silica has the largest contact angle. Comparison of the sliding angle among Examples 1-1 to 1-5 shows that

TABLE 1

| | | Example 1-1 | Example 1-2 | Example 1-3 | Example 1-4 | Example 1-5 | Example 1-6 |
|---|---|---|---|---|---|---|---|
| | Uncured Silicone Resin | 100 | 100 | 100 | 100 | 100 | 100 |
| | Catalyst | 6 | 6 | 6 | 6 | 6 | 6 |
| Water-Repellent Particles | Hydrophilic Fumed Silica | 5 | | | | | |
| | Hydrophobic Fumed Silica | | 7 | 2 | 7 | 7 | |
| | Ungranulated Carbon Black | | | | | | 4 |
| Filler Particles | Hydrophilic Large Particle Size Silica | 16 | 24 | 24 | | | 24 |
| | Hydrophobic Large Particle Size Silica | | | | 24 | 24 | |
| | Fluororesin Solution (Fluororesin Solid Content) | | | 6 (0.9) | | 6 (0.9) | |
| | Xylene | 448 | | | | | 448 |
| | Toluene | | 448 | 442 | 448 | 442 | |
| Silicone Resin Solid Concentration (mass %) | | 17 | 17 | 17 | 17 | 17 | 17 |
| Total Solids Concentration (mass %) | | 20 | 21 | 21 | 21 | 21 | 22 |
| Average Particle Size of Filler Particles/ Average Particle Size of Water-Repellent Particles | | 67.5 | 169 | 169 | 169 | 169 | 77.1 |
| BET Specific Surface Area of Filler Particles/BET Specific Surface Area of Water-Repellent Particles | | 4.6-8.6 | 2.3-33 | 2.3-33 | 2.3-3.3 | 2.3-3.3 | 4.4 |
| Total Content of Water-Repellent Particles and Filler Particles | | 21 | 26 | 26 | 26 | 26 | 28 |
| Content of Filler Particles/ Content of Water-Repellent Particles | | 3.2 | 12 | 12 | 12 | 12 | 6.0 |
| Contact Angle (°) | | 158 | 155 | 152 | 153 | 156 | 157 |
| Sliding Angle (°) | | 7 | 1 | 3 | 8 | 3 | 6 |
| Mortar Stain | | B | B | A | B | A | B |

(Test Method)

<Contact Angle>

For each of Examples 1-1 to 1-6, a contact angle was measured by a tangent method using a contact angle meter (DM-500 made by Kyowa Interface Science Co., Ltd.) by dripping 1.6 µl of pure water onto a surface of the water-repellent structure under the following conditions: a temperature of 25° C. and a humidity of 50%.

<Sliding Angle>

For each of Examples 1-1 to 1-6, a sliding angle was measured by a sliding method using a contact angle meter (DM-500 made by Kyowa Interface Science Co., Ltd.) by dripping 1.6 µl of pure water onto the surface of the water-repellent structure under the following conditions: a temperature of 25° C. and a humidity of 50%.

<Mortar Stain>

For each of Examples 1-1 to 1-6, the water-repellent structure was immersed in mortar, which was produced by adding 20 kg of dry mortar to 3.7 L of water and mixing it with a hand mixer, such that the surface of the water- Example 1-2 containing a combination of hydrophobic fumed silica and hydrophilic large particle size silica and containing no fluororesin has the smallest sliding angle. Comparison of the mortar stain resistance among Examples 1-1 to 1-5 shows that Examples 1-3 and 1-5 containing fluororesin have high mortar stain resistance.

Comparison between Examples 1-2 and 1-3 containing a combination of hydrophobic fumed silica and hydrophilic large particle size silica shows that Example 1-2 containing no fluororesin has a larger contact angle and a smaller sliding angle and thus has higher water repellency than Example 1-3 containing fluororesin. On the other hand, comparison between Examples 1-4 and 1-5 containing a combination of hydrophobic fumed silica and hydrophobic large particle size silica shows that Example 1-5 containing fluororesin has a larger contact angle and a smaller sliding angle and thus has higher water repellency than Example 1-4 containing no fluororesin.

Comparison between Examples 1-2 and 1-4 containing no fluororesin shows that Example 1-2 containing hydrophilic large particle size silica has a larger contact angle and a smaller sliding angle and thus has higher water repellency than Example 1-4 containing hydrophobic large particle size silica. On the other hand, comparison between Examples 1-3 and 1-5 containing fluororesin shows that the sliding angle is the same, but Example 1-5 containing hydrophobic large particle size silica has a larger contact angle and thus has higher water repellency than Example 1-3 containing hydrophilic large particle size silica.

[Evaluation Test 2]

(Water-Repellent Structures)

The following water-repellent structures of Examples 2-1 to 2-7 and Comparative Example 2-1 were produced. The configurations of these water-repellent structures are also shown in Table 2.

Example 2-1

A water-repellent coating agent was prepared by adding an uncured silicone resin (XR31-B2733 made by Momentive Performance Materials Japan LLC.) that would serve as a binder resin, an organic titanium compound (TC-750 made by Matsumoto Fine Chemical Co., Ltd., titanium diisopropoxy bis(ethyl acetoacetate)) as a curing agent, hydrophilic fumed silica (AEROSIL OX50 made by NIPPON AEROSIL CO., LTD, average particle size: 40 nm, BET specific surface area: 50±15 $m^2/g$) as water-repellent particles, hydrophilic large particle size silica (SYLYSIA 310P made by FUJI SILYSIA CHEMICAL LTD., average particle size: 2.7 μm, BET specific surface area: 300 $m^2/g$) as filler particles, and a fluororesin solution (FluoroSurf FS2060-15 made by Fluoro Technology Co., LTD., 15 mass % solution) to toluene as an organic solvent and stirring the resultant mixture. The water-repellent coating agent was prepared so that the uncured silicone resin solid concentration was 17 mass %, the contents of the organic titanium compound, hydrophilic fumed silica, hydrophilic large particle size silica, and fluororesin solution were 6 parts by mass, 5 parts by mass, 24 parts by mass, and 6 parts by mass per 100 parts by mass of the uncured silicone resin, respectively, and the total solids concentration was 22 mass %. A non-woven fabric with a basis weight of 20 $g/m^2$ (E05020 made by Asahi Kasei Corporation) was dip-coated with the water-repellent coating agent and then left at 80° C. for 30 minutes for drying. A water-repellent structure in which a water-repellent layer was formed on the non-woven fabric was thus obtained. This water-repellent structure was used as Example 2-1.

Example 2-2

A water-repellent structure, which was obtained in a manner similar to that of Example 2-1 except that a non-woven fabric with a basis weight of 30 $g/m^2$ (E05030 made by Asahi Kasei Corporation) was used, was used as Example 2-2.

Example 2-3

A water-repellent structure, which was obtained in a manner similar to that of Example 2-1 except that a non-woven fabric with a basis weight of 40 $g/m^2$ (E05040 made by Asahi Kasei Corporation) was used, was used as Example 2-3.

Example 2-4

A water-repellent structure, which was obtained in a manner similar to that of Example 2-1 except that a non-woven fabric with a basis weight of 50 $g/m^2$ (E05050 made by Asahi Kasei Corporation) was used and the water-repellent coating agent was left at 150° C. for 2 minutes for drying, was used as Example 2-4.

Example 2-5

A water-repellent structure, which was obtained in a manner similar to that of Example 2-4 except that a non-woven fabric with a basis weight of 100 $g/m^2$ (E05100 made by Asahi Kasei Corporation) was used, was used as Example 2-5.

Example 2-6

A water-repellent structure, which was obtained in a manner similar to that of Example 2-1 except that a polycarbonate resin plate was used instead of the non-woven fabric and the polycarbonate resin plate was spray-coated with the water-repellent coating agent, was used as Example 2-6.

Example 2-7

A water-repellent structure, which was obtained in a manner similar to that of Example 2-1 except that a non-woven fabric with a basis weight of 12 $g/m^2$ (E05012 made by Asahi Kasei Corporation) was used, was used as Example 2-7.

Comparative Example 2-1

A water-repellent structure, which was obtained in a manner similar to that of Example 2-1 except that a water-repellent coating agent prepared by adding no water-repellent particles and adding 15 parts by mass of filler particles per 100 parts by mass of a silicone resin and prepared so that the total solids concentration was 20 mass % was used and a non-woven fabric with a basis weight of 50 $g/m^2$ (E05050 made by Asahi Kasei Corporation) was used, was used as Comparative Example 2-1.

TABLE 2

|  | Example 2-1 | Example 2-2 | Example 2-3 | Example 2-4 | Example 2-5 | Example 2-6 | Example 2-7 | Comparative Example 2-1 |
| --- | --- | --- | --- | --- | --- | --- | --- | --- |
| Uncured Silicone Resin | 100 | 100 | 100 | 100 | 100 | 100 | 100 | 100 |
| Catalyst | 6 | 6 | 6 | 6 | 6 | 6 | 6 | 6 |
| Hydrophilic Fumed Silica | 5 | 5 | 5 | 5 | 5 | 5 | 5 | |
| Hydrophilic Large Particle Size Silica | 24 | 24 | 24 | 24 | 24 | 24 | 24 | 15 |
| Fluororesin Solution | 6 | 6 | 6 | 6 | 6 | 6 | 6 | 6 |
| Toluene | 442 | 442 | 442 | 442 | 442 | 442 | 442 | 442 |

TABLE 2-continued

|  |  | Example 2-1 | Example 2-2 | Example 2-3 | Example 2-4 | Example 2-5 | Example 2-6 | Example 2-7 | Comparative Example 2-1 |
|---|---|---|---|---|---|---|---|---|---|
| Silicone Resin Solid Concentration (mass %) | | 17 | 17 | 17 | 17 | 17 | 17 | 17 | 17 |
| Total Solids Concentration (mass %) | | 22 | 22 | 22 | 22 | 22 | 22 | 22 | 20 |
| Average Particle Size of Filler Particles/ Average Particle Size of Water-Repellent Particles | | 67.5 | 67.5 | 67.5 | 67.5 | 67.5 | 67.5 | 67.5 | |
| BET Specific Surface Area of Filler Particles/BET Specific Surface Area of Water-Repellent Particles | | 4.6-8.6 | 4.6-8.6 | 4.6-8.6 | 4.6-8.6 | 4.6-8.6 | 4.6-8.6 | 4.6-8.6 | |
| Total Content of Water-Repellent Particles and Filler Particles | | 29 | 29 | 29 | 29 | 29 | 29 | 29 | 15 |
| Content of Filler Particles/ Content of Water-Repellent Particles | | 4.8 | 4.8 | 4.8 | 4.8 | 4.8 | 4.8 | 4.8 | |
| Base Material | | Non-Woven Fabric | Non-Woven Fabric | Non-Woven Fabric | Non-Woven Fabric | Non-Woven Fabric | PC | Non-Woven Fabric | Non-Woven Fabric |
| Basis Weight (g/m²) | | 20 | 30 | 40 | 50 | 100 | | 12 | 50 |
| Coating Method | | Dip | Dip | Dip | Dip | Dip | Spray | Dip | Dip |
| Drying Conditions | | 80° C. 30 min | 80° C. 30 min | 80° C. 30 min | 150° C. 2 min | 150° C. 2 min | 80° C. 30 min | 80° C. 30 min | 80° C. 30 min |
| Contact Angle (°) | Before Abrasion | 148 | 145 | 141 | 145 | 141 | 148 | 140 | 133 |
| | After Abrasion | 145 | 142 | 145 | 142 | 141 | 146 | 137 | |
| Abrasion Amount (μm) | | 19 | 24 | 24 | 15 | 12 | 61 | 21 | |

(Test Method)

<Contact Angle>

For each of Examples 2-1 to 2-7 and Comparative Examples 2-1, a contact angle before abrasion was measured in a manner similar to that of Evaluation Test 1.

For each of Examples 2-1 to 2-7, a 12 mm by 12 mm abrasive tape (grit #1000) was placed in contact with the water-repellent structure placed on a flat plate of a surface property measurement device (made by Shinto Scientific Co., Ltd., device name: TYPE 14DR), and the water-repellent structure was abraded under the following conditions: a load of 200 g, a speed of 2000 mm/min, a rubbing distance of 20 mm, and 20 rubs. Subsequently, a contact angle after abrasion was measured with the surface property measurement device in a manner similar to the contact angle before abrasion.

<Abrasion Amount>

For each of Examples 2-1 to 2-7, the abrasion amount (μm) was measured after abrasion was performed under conditions similar to the above abrasion conditions.

(Test Results)

The test results are shown in Table 2. According to Table 2, it can be seen that each of Examples 2-1 to 2-7 has so-called super water repellency with a contact angle before abrasion of 140° or more. On the other hand, it can be seen that Comparative Example 2-1 in which the water-repellent coating agent contains no water-repellent particles does not have super water repellency with a contact angle before abrasion of 133°. The contact angle after abrasion and abrasion amount of Comparative Example 2-1 were not measured because it did not have super water repellency before abrasion.

It can be seen that each of Examples 2-1 to 2-6 has a contact angle after abrasion of 140° or more and thus has super water repellency. On the other hand, it can be seen that Example 2-7 using a non-woven fabric with a basis weight of 12 g/m² has a contact angle before abrasion of 137° and therefore does not have super water repellency.

It can be seen that the abrasion amount of each of Examples 2-2 to 2-5 was less than 40 μm and Examples 2-1 to 2-5 have abrasion resistance. On the other hand, it can be seen that the abrasion amount of Example 2-6 using a polycarbonate resin plate is 61 μm and Example 2-6 does not have abrasion resistance.

[Evaluation Test 3]

(Water-Repellent Structures)

The following water-repellent structures of Examples 3-1 to 3-6 and Comparative Example 3-1 were prepared. The configurations of these water-repellent structures are also shown in Table 3.

Example 3-1

A water-repellent coating agent was prepared by adding an uncured silicone resin (XR31-B2733 made by Momentive Performance Materials Japan LLC.) that would serve as a binder resin, an organic titanium compound (TC-750 made by Matsumoto Fine Chemical Co., Ltd., titanium diisopropoxy bis(ethyl acetoacetate)) as a curing agent, hydrophilic fumed silica (AEROSIL OX50 made by NIPPON AEROSIL CO., LTD, average particle size: 40 nm, BET specific surface area: 50±15 m²/g) as water-repellent particles, hydrophilic large particle size silica (SYLYSIA 310P made by FUJI SILYSIA CHEMICAL LTD., average particle size: 2.7 μm, BET specific surface area: 300 m²/g) as filler particles, and an ethylene-acrylic acid copolymer wax (AC540 made by Honeywell International Inc.) to toluene as an organic solvent and stirring the resultant mixture. The contents of the organic titanium compound, hydrophilic fumed silica, hydrophilic large particle size silica, and ethylene-acrylic acid copolymer wax in the water-repellent coating agent were 6 parts by mass, 36 parts by mass, 4 parts by mass, and 7 parts by mass per 100 parts by mass of the uncured silicone resin, respectively. The content of the ethylene-acrylic acid copolymer wax with respect to the sum of the contents of the water-repellent particles, filler particles, and silicone resin was 5 mass %. A surface of a base material that was a polycarbonate resin plate was spray-coated with this water-repellent coating agent and then left indoors at 80° C. for 30 minutes for drying. A water-repellent structure in which a water-repellent layer was formed on the base material was thus obtained. This water-repellent structure was used as Example 3-1.

Example 3-2

A water-repellent structure, which was obtained in a manner similar to that of Example 3-1 except that a water-repellent coating agent prepared by adding 14 parts by mass of an ethylene-acrylic acid copolymer wax per 100 parts by mass of a silicone resin was used, was used as Example 3-2. The content of the ethylene-acrylic acid copolymer wax with respect to the sum of the contents of the water-repellent particles, filler particles, and silicone resin of Example 3-2 was 10 mass %.

Example 3-3

A water-repellent structure, which was obtained in a manner similar to that of Example 3-1 except that a water-repellent coating agent prepared by adding 35 parts by mass of hydrophilic fumed silica per 100 parts by mass of a silicone resin and 21 parts by mass of an ethylene-acrylic acid copolymer wax per 100 parts by mass of the silicone resin was used and a polyvinyl chloride resin plate was used instead of a polycarbonate resin plate, was used as Example 3-3. The content of the ethylene-acrylic acid copolymer wax with respect to the sum of the contents of the water-repellent particles, filler particles, and silicone resin of Example 3-3 was 15 mass %.

Example 3-4

A water-repellent structure, which was obtained in a manner similar to that of Example 3-1 except that a water-repellent coating agent prepared by adding 28 parts by mass of an ethylene-acrylic acid copolymer wax per 100 parts by mass of a silicone resin was used and a polyvinyl chloride resin plate was used instead of a polycarbonate resin plate, was used as Example 3-4. The content of the ethylene-acrylic acid copolymer wax with respect to the sum of the contents of the water-repellent particles, filler particles, and silicone resin of Example 3-4 was 20 mass %.

Example 3-5

A water-repellent structure, which was obtained in a manner similar to that of Example 3-1 except that a water-repellent coating agent prepared by adding a high-density oxidized polyethylene wax (AC320 made by Honeywell International Inc.) instead of an ethylene-acrylic acid copolymer wax was used, was used as Example 3-5. The content of the high-density oxidized polyethylene wax with respect to the sum of the contents of the water-repellent particles, filler particles, and silicone resin of Example 3-5 was 5 mass %.

Example 3-6

A water-repellent structure, which was obtained in a manner similar to that of Example 3-5 except that a water-repellent coating agent prepared by adding 14 parts by mass of a high-density oxidized polyethylene wax per 100 parts by mass of a silicone resin was used and the water-repellent coating agent was left at 150° C. for 2 minutes for drying, was used as Example 3-6. The content of the high-density oxidized polyethylene wax with respect to the sum of the contents of the water-repellent particles, filler particles, and silicone resin of Example 3-6 was 10 mass %.

Comparative Example 3-1

A water-repellent structure, which was obtained in a manner similar to that of Example 3-1 except that a water-repellent coating agent containing no ethylene-acrylic acid copolymer wax was used, was used as Comparative Example 3-1.

TABLE 3

|  | Example 3-1 | Example 3-2 | Example 3-3 | Example 3-4 | Example 3-5 | Example 3-6 | Comparative Example 3-1 |
|---|---|---|---|---|---|---|---|
| Uncured Silicone Resin | 100 | 100 | 100 | 100 | 100 | 100 | 100 |
| Catalyst | 6 | 6 | 6 | 6 | 6 | 6 | 6 |
| Hydrophilic Fumed Silica | 36 | 36 | 35 | 36 | 36 | 36 | 36 |
| Hydrophilic Large Particle Size Silica | 4 | 4 | 4 | 4 | 4 | 4 | 4 |
| Ethylene-Acrylic Acid Copolymer Wax | 7 | 14 | 21 | 28 |  |  |  |
| High-Density Oxidized Polyolefin Wax |  |  |  |  | 7 | 14 |  |
| Toluene | 601 | 601 | 601 | 601 | 601 | 601 | 601 |
| Silicone Resin Solid Concentration (mass %) | 13 | 13 | 12 | 12 | 13 | 13 | 13 |
| Total Solids Concentration (mass %) | 20 | 20 | 21 | 22 | 19 | 19 | 19 |
| Average Particle Size of Filler Particles Average Particle Size of Water-Repellent Particles | 67.5 | 67.5 | 67.5 | 67.5 | 67.5 | 67.5 | 67.5 |
| BET Specific Surface Area of Filler Particles/BET Specific Surface Area of Water-Repellent Particles | 4.6-8.6 | 4.6-8.6 | 4.6-8.6 | 4.6-8.6 | 4.6-8.6 | 4.6-8.6 | 4.6-8.6 |
| Total Content of Water-Repellent Particles and Filler Particles | 40 | 40 | 39 | 40 | 40 | 40 | 40 |
| Content of Water-Repellent Particles/Content of Filler Particles | 9 | 9 | 8.6 | 9 | 9 | 9 | 9 |
| Content of Oxidized Polyolefin Wax with Respect to Sum of Contents of Water-Repellent Particles, Filler Particles, and Binder Resin (mass %) | 5 | 10 | 15 | 20 | 5 | 10 |  |

TABLE 3-continued

|  | Example 3-1 | Example 3-2 | Example 3-3 | Example 3-4 | Example 3-5 | Example 3-6 | Comparative Example 3-1 |
| --- | --- | --- | --- | --- | --- | --- | --- |
| Base Material | PC | PC | PVC | PVC | PC | PC | PC |
| Coating Method | Spray | Spray | Spray | Spray | Spray | Spray | Spray |
| Drying Conditions | 80° C. 30 min | 80° C. 30 min | 80° C. 30 min | 80° C. 30 min | 80° C. 30 min | 150° C. 2 min | 80° C. 30 min |
| Contact Angle (°) | 158 | 156 | 150 | 143 | 152 | 155 | 151 |
| Sliding Angle (°) | 2 | 4 | 7 | 21 | 9 | 11 | 46 |
| Abrasion | A | A | A | A | A | A | B |

(Test Method)

<Contact Angle>

For each of Examples 3-1 to 3-6 and Comparative Examples 3-1, a contact angle was measured in a manner similar to that of Evaluation Test 1.

<Sliding Angle>

For each of Examples 3-1 to 3-6 and Comparative Examples 3-1, a sliding angle was measured in a manner similar to that of Evaluation Test 1.

<Abrasion>

For each of Examples 3-1 to 3-6 and Comparative Example 3-1, the water-repellent layer of the water-repellent structure was abraded by rubbing with hand, and the water-repellent structure was then checked for decrease in water repellency. The decrease in water repellency was evaluated as follows: A: no significant decrease in water repellency, and B: a significant decrease in water repellency.

(Test Results)

The test results are shown in Table 3. According to Table 3, it can be seen that each of Examples 3-1 to 3-6 has so-called super water repellency with a contact angle of 140° or more, has a small sliding angle, and has no significant decrease in water repellency and thus has high abrasion resistance. On the other hand, it can also be seen that Comparative Example 3-1 containing no oxidized polyolefin wax has a contact angle of 140° or more, but has a large sliding angle and has a significant decrease in water repellency and is thus prone to abrasion.

Comparison of the sliding angle among Examples 3-1 to 3-4 shows that Example 3-4 in which the content of the ethylene-acrylic acid copolymer wax with respect to the sum of the contents of the water-repellent particles, filler particles, and silicone resin is 20 mass % has the largest sliding angle. On the other hand, this comparison also shows that Examples 3-1 to 3-3 in which the content of the ethylene-acrylic acid copolymer wax to the sum of the contents of the water-repellent particles, filler particles, and silicone resin is 15 mass % or less have a particularly small sliding angle and have higher water repellency.

The present invention is useful in the technical field of water-repellent structures, manufacturing methods therefor, and water-repellent coating agents employed in the same.

What is claimed is:

1. A water-repellent structure, comprising:
a base material; and
a water-repellent layer located on a surface of the base material, wherein
the water-repellent layer contains water-repellent particles including hydrophilic fumed silica, and filler particles including hydrophilic large particle size silica and having an average particle size that is 20 times or more as large as an average particle size of the water-repellent particles, and
a ratio of a BET specific surface area of the filler particles to a BET specific surface area of the water-repellent particles is 2 or more and 20 or less.

2. The water-repellent structure of claim 1, wherein the filler particles include silica particles having an average particle size of 1 μm or more.

3. A water-repellent structure, comprising:
a base material; and
a water-repellent layer located on a surface of the base material, wherein
the water-repellent layer contains water-repellent particles and filler particles having an average particle size that is 20 times or more as large as an average particle size of the water-repellent particles, and
the water-repellent particles include ungrained carbon black.

4. A water-repellent structure, comprising:
a base material; and
a water-repellent layer located on a surface of the base material, wherein
the water-repellent layer contains water-repellent particles and filler particles having an average particle size that is 20 times or more as large as an average particle size of the water-repellent particles, and
the water-repellent layer further contains an oxidized polyolefin wax.

5. A water-repellent structure, comprising:
a non-woven fabric; and
a water-repellent layer located on a surface of the non-woven fabric, wherein
the water-repellent layer contains water-repellent particles and filler particles having a larger average particle size than the water-repellent particles, and
a basis weight of the non-woven fabric is 800 g/m$^2$ or less.

6. The water-repellent structure of claim 5, wherein fibers forming the non-woven fabric include polyester fibers.

7. A water-repellent structure, comprising
a non-woven fabric; and
a water-repellent layer located on a surface of the non-woven fabric, wherein
the water repellent layer contains water-repellent particles and filler particles having a larger average particle size than the water-repellent particles, and
a basis weight of the non-woven fabric is 20 g/m$^2$ or more.

8. A method for manufacturing a water-repellent structure, comprising forming a water-repellent layer by coating a surface of a base material with a water-repellent coating agent, wherein
the water-repellent coating agent contains water-repellent particles including hydrophilic fumed silica, filler particles including hydrophilic large particle size silica and having an average particle size that is 20 times or more as large as an average particle size of the water-repellent particles, and an uncured binder resin, and a ratio of a BET specific surface area of the filler particles to a BET specific surface area of the water-repellent particles is 2 or more and 20 or less.

9. A method for manufacturing a water-repellent structure, comprising forming a water-repellent layer by coating a surface of a non-woven fabric with a water-repellent coating agent, wherein the water-repellent coating agent contains water-repellent particles, filler particles having a larger average particle size than the water-repellent particles, and an uncured binder resin, and a basis weight of the non-woven fabric is 800 g/m$^2$ or less.

10. The method for manufacturing a water-repellent structure of claim 9, wherein the surface of the non-woven fabric is dip-coated with the water repellent coating agent.

11. A water-repellent coating agent containing water-repellent particles, filler particles having an average particle size that is 20 times or more as large as an average particle size of the water-repellent particles, an uncured binder resin, and an oxidized polyolefin wax.

12. The water-repellent coating agent of claim 11, further containing either or both of an aromatic hydrocarbon solvent and an aliphatic hydrocarbon solvent.

* * * * *